April 3, 1928.
G. M. OSBORN
MILK CAN COOLER
Filed Oct. 25, 1926
1,664,702
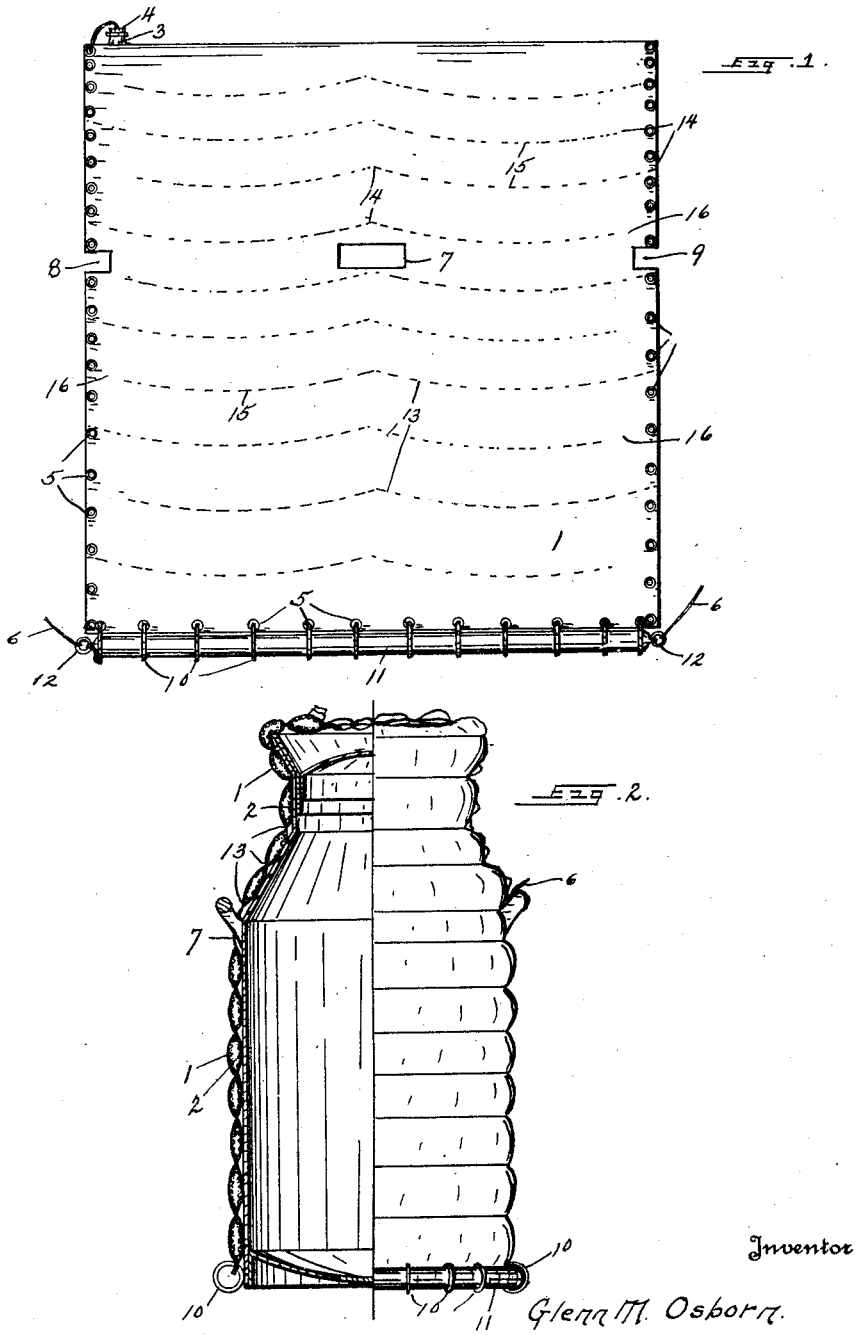
Inventor
Glenn M. Osborn.
By R. M. Thomas.
Attorney Patented Apr. 3, 1928.

1,664,702

UNITED STATES PATENT OFFICE.

GLENN M. OSBORN, OF SALT LAKE CITY, UTAH.

MILK-CAN COOLER.

Application filed October 25, 1926. Serial No. 144,146.

My invention relates to coolers and has for its object to provide a new and efficient blanket to be used on milk cans and similar objects wherein liquids are shipped to keep them cool and fresh.

A further object is to provide an efficient blanket which can be used to envelop milk cans to keep them cool when shipping or when standing waiting to be shipped, or can be used to cover up meats and vegetables when they are transported to towns from the farms or to cool them while delivering around to the different customers. After beef or calves have been killed and dressed, it would be very efficient to use to cool them quickly before butchering for the different cuts or shipping them to markets.

These objects I accomplish with the device illustrated in the accompanying drawings in which similar numerals and letters of reference indicate like parts throughout the several views and as described in the specification forming a part of this application and pointed out in the appended claims.

In the drawings in which I have shown the best and most preferred manner of building my invention, Figure 1 is a plan view of the cooler spread out, with dotted lines to indicate the divisions therein. Figure 2 is a view of a milk can with the cooler thereon half shown in section.

In the drawings I have shown the milk can as A, the cooler as B. The said cooler is made of two sheets of waterproof material 1 and 2 sewed together on all sides to form a water-tight bag. A spout 3 is secured in the top of the bag and a cork 4 is used to close said spout when the cooler is being used. Near the periphery of the said cooler I provide eyelets 5 through which a cord 6 is passed or laced when the bag is enclosing a milk can or similar article. A hole 7 is cut in the said cooler where the handle of the milk can would be when it is around a can and cuts 8 and 9 are provided in the two sides of the said cooler to surround the other handle of the can. Along the bottom edge of the said cooler rings 10 are provided in the eyelets 5 and a bumper rope 11 is threaded therethrough. The said rope 11 has rings 12 in each end thereof to which the cord 6 is attached at its free ends. The cord is then laced through the eyelets 5 and drawn tight from the top around the article desired to be kept cold. The interior of the said cooler is partially divided into separate compartments by the seams 13. The said seams are sewed through both thicknesses of fabric and are made in a semicircular arc shape, as shown in Figure 1, with the ends and the centers on a higher plane 14 than the lower portion 15 of the arc. This is to insure water remaining in each portion at all times when the cooler is in use and the evaporation of the water will not lower the general level but will lower each seam level separately. The seams are not made the entire distance across the cooler but a space 16 is left at alternate ends, to provide for filling and emptying the bag.

When it is desired to use the bag cooler on a milk can the cord 6 is drawn up with the bumper 11 at the bottom of the can. The handles of the can are placed through the holes 7, and 8 and 9, and the cord is then drawn tight holding the cooler around the can. The cooler may be filled with water or it may be filled before it is placed around the can. The ends of the cord are tied and the cooler is held tightly around the can. When it is desired to use the cooler on vegetables or other articles, the cord 6 is withdrawn from the eyelets 5 and the bumper rope 11 drawn from the rings 10 and the cooler may then be used as a cover blanket over a load of vegetables or meats.

It will be obvious that many such uses will be found for the cooler around the farm or by the vegetable grocers and fruit dealers.

Having thus described my invention I desire to secure by Letters Patent and claim:

1. In a cooler for milk cans, the combination of two spaced apart sheets of flexible material sewed together on the edges to form a water-holding bag; a filling spout secured on one end of said bag; holes through said bag to allow handles to pass therethrough; eyelets in or near the bottom and sides of said bag; rings in the bottom eyelets; a bumper rope through said bottom rings and a cord secured to the ends of said rope and passed through the said eyelets at the sides of said bag to draw the said bag around the milk can.

2. In a cooler, the combination of two spaced apart sheets of flexible material sewed together on their edges to form a water bag; a spout for filling said bag; eyelets in the bottom and sides of said bag and means to draw said bag around any desire object.

3. In a cooler, the combination of a liquid-holding bag made by sewing two sheets of flexible material together on their edges; a spout to fill said bag; and means to secure said bag tightly around an object to keep it cold, by the evaporation therefrom.

In testimony whereof I have affixed my signature.

GLENN M. OSBORN.